United States Patent [19]

Yamamoto

[11] Patent Number: 4,973,989
[45] Date of Patent: Nov. 27, 1990

[54] HALFTONE LASER RECORDING WITH PLURAL BEAMS

[75] Inventor: Yoichi Yamamoto, Nara, Japan

[73] Assignee: Sharp Kabushiki Kaisha, Osaka, Japan

[21] Appl. No.: 370,903

[22] Filed: Jun. 23, 1989

[30] Foreign Application Priority Data

Jun. 24, 1988 [JP] Japan .................................. 63-156197

[51] Int. Cl.$^5$ ......................... G01D 15/16; H04N 1/21
[52] U.S. Cl. ..................................... 346/108; 358/298
[58] Field of Search .................. 346/107 R, 108, 160, 346/76 L; 358/298, 296, 300, 302

[56] References Cited

U.S. PATENT DOCUMENTS 4,506,275 3/1985 Maeda .................................. 346/108
4,539,478 9/1985 Sano .................................... 346/108

Primary Examiner—Mark J. Reinhart
Attorney, Agent, or Firm—Irell & Manella

[57] ABSTRACT

A laser beam projecting unit, including a plurality of laser beam generators which are selectively energized according to the level of halftone, and a laser beam combiner for combining the laser beams emitted from the laser beam generator. Moreover, a laser writing apparatus is disclosed which comprises the laser beam projecting unit as mentioned above and a recording medium for receiving the laser beam combined in the laser beam combiner.

10 Claims, 1 Drawing Sheet

HALFTONE LASER RECORDING WITH PLURAL BEAMS

BACKGROUND OF THE INVENTION

1. Field of the invention:

The present invention relates to a laser beam projecting unit and a laser writing apparatus, which can be used in laser printers, laser copying machines, laser beam machines, laser printing machines, laser plate-making machines and the like. More particularly, the present invention relates to a laser beam projecting unit capable of projecting a stable laser beam of an intensity corresponding to the level of halftone, and to a laser writing apparatus capable of yielding excellent reproduction of the halftone gradations of a stored image.

2. Description of the prior art:

Conventional methods for recording a halftone image in a laser writing apparatus or the like include a first method wherein the light output of a laser beam generating means such as a semiconductor laser is varied to give a gradation of halftone to each pixel formed on a recording medium, and a second method wherein each pixel formed on a recording medium is segmented into a plurality of sub-pixels, and while the light output of a laser beam generating means is stabilized at a fixed level, the laser beam is projected only onto an appropriate number of sub-pixels selected from the plurality of sub-pixels according to the halftone of each pixel, thereby attaining the recording of a halftone image.

However, the first method requires precise control to vary the light output of the laser beam generating means to a plurality of levels and yet to stabilize it at each level, which is extremely difficult. On the other hand, the second method has the problem that an appropriate number of sub-pixels must be selected from the plurality of sub-pixels to project the laser beam thereon so that the halftone of each pixel can be reproduced, which requires a complicated process.

SUMMARY OF THE INVENTION

The laser beam projecting unit of this invention, which overcomes the above-discussed and numerous other disadvantages and deficiencies of the prior art, comprises a plurality of laser beam generating means which are selectively energized according to the level of halftone, and a laser beam combining means for combining the laser beams emitted from said laser beam generating means.

In a preferred embodiment, the light outputs of said laser beam projecting means are set at different levels from one another.

In a more preferred embodiment, the abovementioned laser beam projecting unit comprises an n number of laser beam generating means, wherein the light outputs of said laser beam generating means are set so that the factors of $2^{n-1}$, $2^{n-2}$, ..., $2^2$, $2^1$ and $2^0$ are given in an order of decreasing light output.

In a preferred embodiment, the laser beam generating means comprises a semiconductor laser.

The laser writing apparatus of this invention comprises the laser beam projecting unit as mentioned above and a recording medium for receiving the laser beam combined in said laser beam combining means.

In a preferred embodiment, the recording medium is a liguid crystal cell.

The preferred laser beam projecting unit of this invention comprises an n number of laser beam generating means which are selectively energized according to the level of halftone and which are arranged in an order of decreasing light output, and a laser beam combining means for combining the laser beams emitted from said laser beam generating means, wherin said laser beam combining means comprises a reflector corresponding to the laser beam generating means with the maximum output, and an $n-1$ number of directional couplers corresponding to the other laser beam generating means and converging laser beams incident from two different directions onto a fixed optical axis to output, wherein said reflector and said directional couplers are disposed in such a manner that the laser beam emitted from said laser beam generating means with the maximum output passes through said directional couplers one by one, while in each of said directional couplers the laser beam emitted from the laser beam generating means corresponding to said directional coupler is combined with the laser beam emitted from the laser beam generating means with a greater output.

In a more preferred embodiment, the laser beam generating means comprises a semiconductor laser.

The preferred laser writing apparatus of this invention comprises the laser beam projecting unit as mentioned above and a recording medium for receiving the laser beam combined in said laser beam combining means.

In a more preferred embodiment, the recording medium is a liquid crystal cell.

Thus, the invention described herein makes possible the objectives of (1) providing a laser beam projecting unit in which the outputs of the laser beam generating means are not varied in steps but are stabilized at respectively fixed levels, and the laser beams emitted from the laser beam generating means selected according to the halftone are combined in the laser beam combining means, so that the light output corresponding to the halftone can be obtained with excellent stability; and (2) providing a laser writing apparatus in which the recording can be made on the recording medium with the use of the light output corresponding to each gradation of halftone with excellent stability, so that an image with excellent halftone gradiations can be reproduced.

BRIEF DESCRIPTION OF THE DRAWINGS

This invention may be better understood and its numerous objects and advantages will become apparent to those skilled in the art by reference to the accompanying drawing as follows.

DESCRIPTION OF THE PREFERRED EMBODIMENTS

Figure 1:
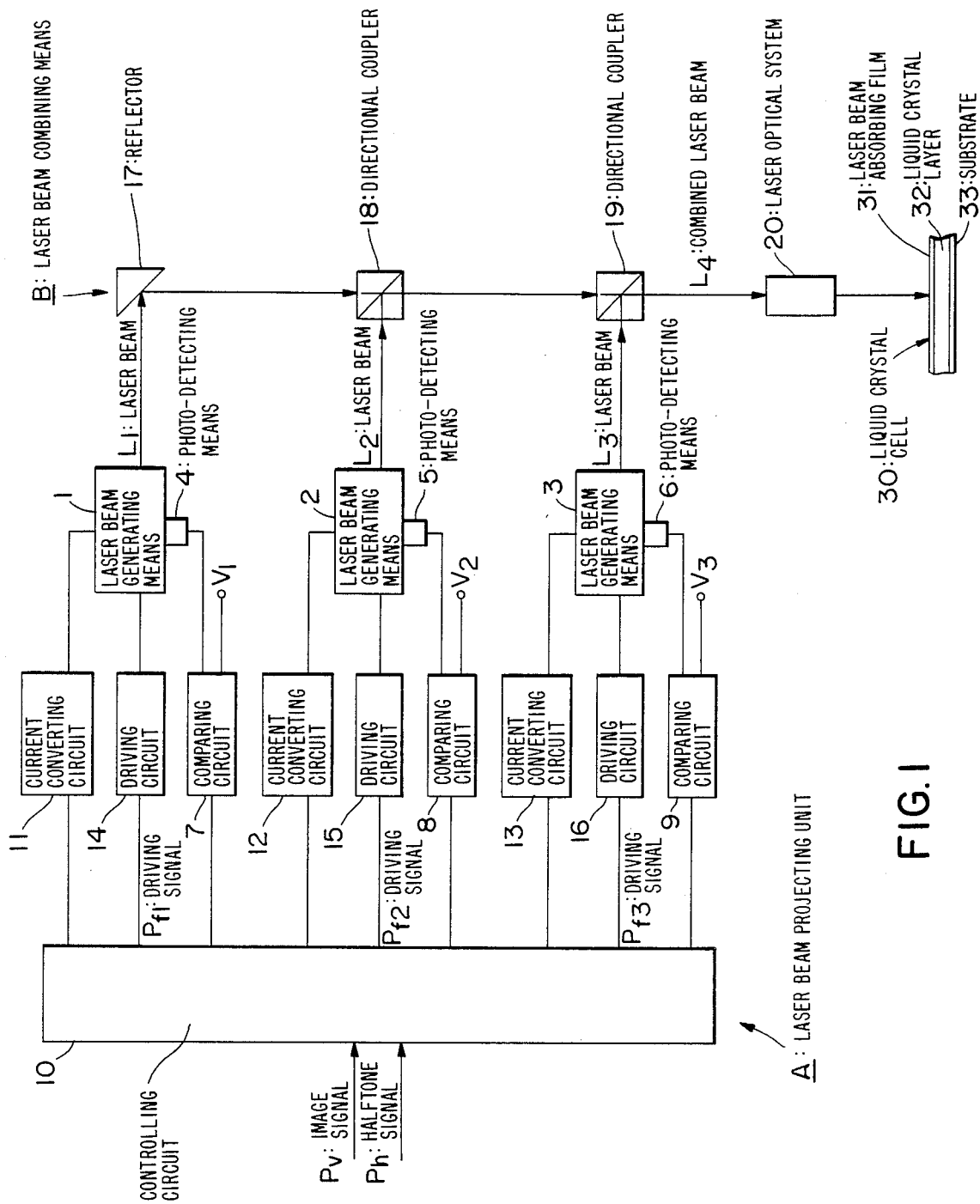
FIG. 1 is a block diagram of a laser writing apparatus using a laser beam projecting unit of this invention.

In the laser beam projecting unit of this invention, laser beams are emitted from the plurality of laser beam generating means that are selectively energized according to the level of halftone, and these laser beams are then combined to produce a laser beam having light energy of a gradation corresponding to the total output of the energized laser beam generating means, the combined laser beam being projected onto a pixel on the recording medium in the laser writing apparatus or the like to reproduce a halftone image.

Also, because the output of each laser beam generating means is not varied to different levels but stabilized at a fixed level, stable reproduction of a hafltone image can be obtained. Furthermore, there is no need for a complicated process in which an appropriate number of sub-pixels are selected from a plurality of sub-pixels present in each pixel to project a laser beam thereon so that the halftone of the pixel can be reproduced.

The light outputs of the plurality of laser beam generating means may be set all at the same level, but alternatively, the light output of at least one laser beam generating means may be set at a different level from those of the other laser beam generating means, taking into account the attenuation of light energy within the laser beam combining means for the laser beam emitted from each laser beam generating means.

Further, when a fewer number of laser beam generating means, for example, an n number of laser beam generating means, are used to control gradations of halftone, the light outputs of the laser beam generating means should be set so that the factors of $2^{n-1}, 2^{n-2}, \ldots, 2^2, 2^1$ and $2^0$ are given in an order of decreasing light output.

Although the construction of the laser beam combining means is not particularly restricted, it is desirable to construct the laser beam combining means so that the laser beam emitted from each laser beam generating means will not be diffused when output from the laser beam combining means. For this purpose, the laser beam combining means, for example, when used with an n number of laser beam generating means, should be constructed using an $n-1$ number of directional couplers which receive the laser beams emitted from two different directions and output them along the common optical axis, the directional couplers being disposed in such a manner that the laser beam emitted from one laser beam generating means passes through the directional couplers one by one, while in each directional coupler the laser beam emitted from the one laser beam generating means mentioned above is combined with the laser beam emitted from the laser beam generating means corresponding to this directional coupler.

In this case, the laser beam emitted from the one laser beam generating means mentioned above may be introduced directly into the first directional coupler but it is desirable that the directions of laser beam emission from the respective laser beam generating means be set parallel with one another, considering lightweight and compact designing of the entire laser beam projecting unit. For this purpose, it is advantageous to construct it so that the laser beam emitted from the one laser beam generating means mentioned above is introduced into the first direction coupler after being reflected by a reflector. It is also advantageous to construct it in consideration of the attenuation of light energy within the laser combining means as follows: the laser beam generating means are arranged in the order of decreasing light output; the reflector is disposed for the laser beam generating means with the maximum output, the directional couplers are disposed with a one-to-one correspondence to the other laser beam generating means; the laser beam, which is emitted from the laser beam generating means with the maximum output and reflected by the reflector, passes through the directional couplers one by one, and the reflector and the directional couplers are arranged in such a manner that in each directional coupler the laser beam emitted from the laser beam generating means corresponding to the directional coupler is combined with the laser beam emitted from the laser beam generating means with the maximum output.

EXAMPLES

FIG. 1 is a block diagram of a laser writing apparatus using a laser beam projecting unit of this invention. The laser writing apparatus is constructed to be capable of reproducing the tone of an image in eight gradations. The light receiving surface of a liquid crystal cell 30 which serves as a recording medium is scanned by the laser beam projected from a laser beam projecting unit A so that an image is formed by causing the liquid crystal cell 30 to lose its transmission of light depending upon the magnitude of the light energy of the laser beam.

The laser beam projecting unit A comprises three laser beam generating means 1, 2 and 3; a laser beam combining means B for combining the laser beams emitted from the laser beam generating means 1, 2 and 3; and a laser optical system 20 for scanning the liquid crystal cell 30 with a combined laser beam $L_4$ produced by the laser beam combining means B.

The laser beam generating means 1, 2 and 3 are provided with a semiconductor laser or the like to emit laser beams $L_1$, $L_2$ and $L_3$ of the specified intensities in response to the respective output currents of current converting circuits 11, 12 and 13, respectively. The outputs of the laser beam generating means 1, 2 and 3 may be set all at the same level, or for example, at the proportion of 2:1:1, but in this example, these outputs are set at the proportion of 4:2:1.

Moreover, the laser beam projecting unit A is provided with a known feedback control system to precisely control the outputs of the laser beam generating means 1, 2 and 3.

That is, the feedback control system is constructed as follows: the laser beams $L_1$, $L_2$ and $L_3$ emitted form the laser beam generating means 1, 2 and 3 are detected by photo-detecting means 4, 5 and 6 each having a PIN diode, respectively; the outputs of the photo-detecting means 4, 5 and 6 are compared with reference voltages $V_1$, $V_2$ and $V_3$ corresponding to the respective specified light outputs in comparing circuits 7, 8 and 9, respectively; instruction signals are fed from a controlling circuit 10 to the current converting circuits 11, 12 and 13 on the basis of the outputs of the comparing circuits 7, 8 and 9, respectively; and according to the instruction signals from the controlling circuit 10, the current converting circuits 11, 12 and 13 supply the laser beam generating means 1, 2 and 3 with the appropriate current required to emit the light of the specified intensity, respectively. The reference voltages $V_1$, $V_2$, and $V_3$ which are input to the comparing circuits 7, 8 and 9 from the respective feedback control systems at the time of writing are set and stored in the respective feedback control systems so that the outputs of the laser generating means 1, 2 and 3 are given in the proportion of 4:2:1.

An external image signal $P_v$ and a halftone signal $P_h$ corresponding to the level of halftone are input to the controlling circuit 10, which outputs driving signals $P_{f1}$, $P_{f2}$ and $P_{f3}$ when the image signal $P_v$ and the halftone signal $P_h$ are input simultaneously. The halftone signal $P_h$ consists of bits corresponding to the number of the laser beam generating means, i.e., a 3-bit binary signal in this example: when the image signal $P_v$ is input, if the leftmost bit of the halftone signal $P_h$ is "1", the driving signal $P_{f1}$ is output; when the image signal $P_v$ is input, if the second bit of the halftone signal $P_h$ is "1", the driving signal $P_{f2}$ is output; and when the image signal $P_v$ is input, if the rightmost bit of the halftone signal $P_h$ is "1", the driving signal $P_{f3}$ is output.

The laser beam combining means B comprises a reflector 17 and two directional couplers 18 and 19 aligned therewith.

The laser beams $L_1$, $L_2$ and $L_3$ emitted from the laser beam generating means 1, 2 and 3 are parallel with one another. These laser beams $L_1$, $L_2$, and $L_3$ are incident upon the reflector 17 and the internal mirrors of the directional couplers 18 and 19, respectively, at an angle of 45 degrees, and subsequentially reflected into a fixed direction. The laser beam $L_1$ reflected from the reflector 17, and the laser beams $L_2$ and $L_3$ passing through the directional couplers 18 and 19, respectively, are converged in the directional couplers 18 and 19 onto the same optical axis, resulting in a combined laser beam $L_4$ which is then introduced into the laser optical system 20.

The liquid crystal cell 30 comprises a laser beam absorbing film 31 for receiving the combined laser beam $L_4$, a liquid crystal layer 32, and a substrate 33. The temperature of a portion of the laser beam absorbing film 31 on which the combined laser beam $L_4$ is projected increases according to the magnitude of the light energy of the combined laser beam $L_4$ absorbed into the laser beam absorbing film 31, which causes the liquid crystal to lose its transmission of light over the area corresponding to the degree of increase in temperature, thereby forming in each pixel an image of the size corresponding to the magnitude of the light energy of the combined laser beam $L_4$.

The operation of the above-mentioned laser writing apparatus will hereinafter be described.

The intensity of the combined laser beam $L_4$ from the laser beam projecting unit A is controlled in eight steps from zero when the laser beam generating means 1, 2 and 3 are all off to 7 when the laser beam generating means 1, 2 and 3 are all on.

For example, when the image signal $P_v$ and the signal "101" as the halftone signal $P_h$ corresponding to the 6th intensity "5" in the order of increasing output are given to the control circuit 10, "1" is output as the driving signal $P_{f1}$ to the driving circuit 14 to energize the laser beam generating means 1, "0" is output as the driving signal $P_{f2}$ to the driving circuit 15 to keep the laser beam generating means 2 de-energized, and "1" is output as the driving signal $P_{f3}$ to the driving circuit 16 to energize the laser beam generating means 3. Thus, the laser beam $L_1$ emitted from the energized laser beam generating means 1 and the laser bean $L_3$ emitted from the energized laser beam generating means 3 are combined in the laser beam combining means B to produce the combined laser beam $L_4$ of the light energy "5", which is then projected through the laser optical system 20 onto a designated pixel on the liquid crystal cell 30.

Also, for example, when the image signal $P_v$ and the signal "011" as the halftone signal $P_h$ corresponding to the 4th intensity "3" in the order of increasing output are given to the controlling circuit 10, the laser beam $L_2$ emitted from the laser beam generating means 2 and the laser beam $L_3$ emitted from the laser bean generating means 3 are combined in the laser beam combining means B in the same manner as above to produce the combined laser beam $L_4$ of the light energy "3", which is then projected through the laser optical system 20 onto a designated pixel on the liquid crystal cell 30. Thus, an image of the size corresponding to the light energy of the combined laser beam $L_4$ is formed in the pixel on the liquid crystal cell 30, the pixel being given the halftone lightness.

In this case, because the output of each of the laser beam generating means 1, 2 and 3 is not varied to different levels but is stabilized at a fixed level, the reproduced lightness of halftone is stabilized at each gradation. Also, because the pixels are not segmented into sub-pixels for reproduction of halftone, a complicated process is not required in which an appropriate number of sub-pixels are selected from a plurality of sub-pixels to project the laser beam thereon.

As described above, by successively forming an image in each pixel on the liquid crystal cell 30, a whole image can be obtained with excellent reproducibility of halftone gradations.

In the above example, three laser beam generating means 1, 2 and 3 are provided, and halftone is controlled in eight gradations, but the number of the laser beam generating to means 1, 2 and 3 can be increased or decreased to increase or decrease the number of halftone gradations, or the output ratio of the laser beam generating means 1, 2 and 3 may be changed, for example, to 2:1:1 or 1:1:1 to decrease the number of halftone gradations. Moreover, the recording medium is not restricted to the liquid crystal cell 30, but may be composed of a photoconductor.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A laser beam projecting unit comprising a plurality of laser beam generating means which are selectively energized according to the level of halftone, and a laser beam combining means for combining the laser beams emitted from said laser beam generating means.

2. A laser beam projecting unit according to claim 1, wherein the light outputs of said laser beam projecting means are set at different levels from one another.

3. A laser beam projecting unit, comprising a plurality of laser beam generating means which are selectively energized according to the level of halftone, and a laser beam combining means for combining the laser beams emitted from said laser beam generating means, wherein the light outputs of said laser beam projecting means are set at different levels from one another; and further comprising an n number of laser beam generating means, wherein the light outputs of said laser beam generating means are set so that the factors on $2^{n-1}, 2^{n-2}, \ldots, 2^2, 2^1$ and $2^0$ are given in an order of decreasing light output.

4. A laser beam projecting unit according to claim 1, wherein said laser beam generating means comprises a semiconductor laser.

5. A laser beam projecting unit comprising an n number of laser beam generating means which are selectively energized according to the level of halftone and which are arranged in an order of decreasing light output, and a laser beam combining means for combining the laser beams emitted from said laser beam generating means, wherein said laser beam combining means comprises a reflector corresponding to the laser beam generating means with the maximum output, and an n−1 number of directional couplers corresponding to the other laser beam generating means and converging laser beams incident from two different directions onto a fixed optical axis to output, wherein said reflector and said directional couplers are disposed in such a manner that the laser beam emitted from said laser beam generating means with the maximum output passes through said directional couplers one by one, while in each of said directional couplers the laser beam emitted from the laser beam generating means corresponding to said directional coupler is combined with the laser beam emitted from the laser beam generating means with a greater output.

6. A laser beam projecting unit according to claim 5, wherein said laser beam generating means comprises a semiconductor laser.

7. A laser writing apparatus comprising a laser beam projecting unit of claim 1 and a recording medium for receiving the laser beam combined in said laser beam combining means.

8. A laser writing apparatus according to claim 7, wherein said recording medium is a liquid crystal cell.

9. A laser writing apparatus comprising a laser beam projecting unit of claim 4 and a recording medium for receiving the laser beam combined in said laser beam combining means.

10. A laser writing apparatus according to claim 9, wherein said recording medium is a liquid crystal cell.

* * * * *